United States Patent
Coombs et al.

[19]

[11] Patent Number: 6,110,383
[45] Date of Patent: Aug. 29, 2000

[54] OIL/WATER SEPARATOR

[75] Inventors: Harvey W. Coombs, Springfield; Ron D. Pearson, Whites Creek, both of Tenn.

[73] Assignee: Coombs Industrial Services, Inc., Nashville, Tenn.

[21] Appl. No.: 09/238,463

[22] Filed: Jan. 28, 1999

[51] Int. Cl.⁷ .................................................. C02F 1/40
[52] U.S. Cl. ..................... 210/732; 210/800; 210/808; 210/533; 210/536; 210/537; 210/123; 210/136; 210/241; 210/119
[58] Field of Search ................................... 210/533, 536, 210/537, 123, 121, 124, 136, 241, 732, 800, 708, 709, 808, 117, 119; 95/253, 259

[56] References Cited

U.S. PATENT DOCUMENTS

| | | | |
|---|---|---|---|
| 2,972,412 | 2/1961 | Lundeen | 210/123 |
| 3,745,115 | 7/1973 | Olsen | 210/119 |
| 4,051,030 | 9/1977 | Huiet, Jr. | 210/119 |
| 4,055,499 | 10/1977 | Laxo | 210/119 |
| 4,213,479 | 7/1980 | Pearson | 210/117 |
| 4,436,630 | 3/1984 | Anderson | 210/744 |
| 4,521,312 | 6/1985 | Anderson | 210/744 |
| 4,778,595 | 10/1988 | Sable et al. | 210/123 |
| 5,149,344 | 9/1992 | Macy | 210/119 |
| 5,186,821 | 2/1993 | Murphy | 210/86 |
| 5,378,353 | 1/1995 | Koch | 210/86 |
| 5,637,233 | 6/1997 | Earrusso | 210/767 |
| 5,707,535 | 1/1998 | Harris | 210/804 |
| 5,800,700 | 9/1998 | Liu | 210/109 |

*Primary Examiner*—Robert J. Popovics
*Attorney, Agent, or Firm*—Lucian Wayne Beavers Waddey & Patterson

[57] ABSTRACT

A mobile separator system for receiving and separating a mixed composition of oil, water, and sludge. The mobile separator system including a tank for holding the mixed composition, and a drain manifold that includes a plurality of drain pipes extending into the tank at varying elevations for allowing the drainage of water from the tank system. A vacuum source is attached to the top of the tank for carrying a vacuum within the tank to draw the mixed composition into the tank. The drain manifold is surrounded by a screen that allows the passage of water and oil, while preventing the passage of sludge through the screen into the drain pipes. A floating check valve is connected to each of the drain pipes to regulate the flow of water through the drain pipe. The floating check valve includes a valve element that has a density which causes the valve element to float in water and sink in oil. Therefore, when the valve element is surrounded by oil, the drain pipe will close and impede the passage of oil through the drain pipe. The water is then able to be drained using each drain pipe, with the highest pipe draining the water first, then the next highest, and so on until the water is drained from the tank.

20 Claims, 1 Drawing Sheet

OIL/WATER SEPARATOR

BACKGROUND OF THE INVENTION

The present invention relates generally to an apparatus and method for separating and extracting liquids from a mixed composition, and more specifically, an apparatus and method for use in separating a mixed composition of waste water, sludge, and oil for the removal of the waste water.

A conventional vehicle wash station will generate large quantities of dirty water which includes a small percentage of oil washed from or leaking from various trucks using such a vehicle wash. Most facilities will include an on-site separator which separates out much of the water, with the oil, sludge, and some water remaining in a sump. Periodically, a simple vacuum truck has been used to remove all of the oil, water, and sludge from the sump of the on-site separator system, and to transport the mixed composition to a central disposal site. Such a method is costly and wasteful in that the cost of such a service is based on the gallons of mixed composition that is transported. The water in such a mixed composition could be left at the truck stop, so the customer pays a great deal for transporting what is mostly water that could have been left behind.

Various designs have attempted to provide a design that removes water from grease in an efficient manner. Such a design is shown in U.S. Pat. No. 5,637,233 to Earrusso. The Earrusso patent addresses the problem of disposing of a grease/water mixed composition such as that found at restaurants. The portable separator tank has a complex system using multiple compartments to separate water from grease. The water and grease are pumped into a first compartment and separated according to their densities, the grease typically floating above the water. A tube opening is located near the bottom of the tank to drain the water that is near the bottom of the first compartment into a second compartment. The tube opening can then be closed when the grease begins to be drained through the tube. Although the tube avoids suctioning the grease due to the tube's position at the bottom of the tank and the position of the grease above the water, this design fails to protect the suctioning pipe from drawing other materials located at the bottom of the first compartment that are more dense than water, such as sludge.

What is needed, then, and not found in the prior art, is an apparatus for separating water from a mixed composition of oil, water, and sludge and removing the water while leaving the oil and sludge for remote disposal.

SUMMARY OF THE INVENTION

An object of the present invention is to provide a mobile tank separator system that is suitable for removing water from a mixed composition of oil, sludge, and water. The tank may draw the mixed composition from various locations where waste water is kept, such as vehicle wash stations. The present system provides a portable separator that can be brought to such a vehicle wash station and separate the oil, sludge, water that is suctioned out of the holding sump to extract the water from this combination, leaving the sludge and oil to be transported to a disposal facility.

In accordance with this invention, the apparatus for cleaning the truck wash site includes a tank for receiving the water mixed composition, a set of drain pipes having an upper end extending upward into the tank at various elevations, and a set of floating check valves connected to the upper ends of each drain pipe to allow the passage of water through the drain pipe, but closing when surrounded by a less dense substance. The mixed composition is drawn into the tank by a vacuum source that is connected to the tank. A tank inlet connected to the tank receives the mixed composition from the outside source, and an inlet shut off valve is connected to the tank inlet to allow the tank inlet to be closed by the user.

More specifically, the present invention includes a series of drain pipes and floating check valves that are surrounded by a screen. The drain pipes are provided to allow the removal of water from the mixed composition in the tank. The floating check valves are connected to the drain pipes, and the floating check valves serve to close the open end of the drain pipe when the floating check valve is surrounded by oil to impede the oil from being drained with the water. Additionally, each drain pipe has a drain shut off valve that allows the drain pipe to be manually closed to impede the passage of any additional fluids or other materials. Furthermore, the screen surrounding the open ends of the drain pipes serves to impede the entrance of sludge into the area surrounding the drain pipes and floating check valves.

DESCRIPTION OF THE PREFERRED EMBODIMENTS

Figure 1:
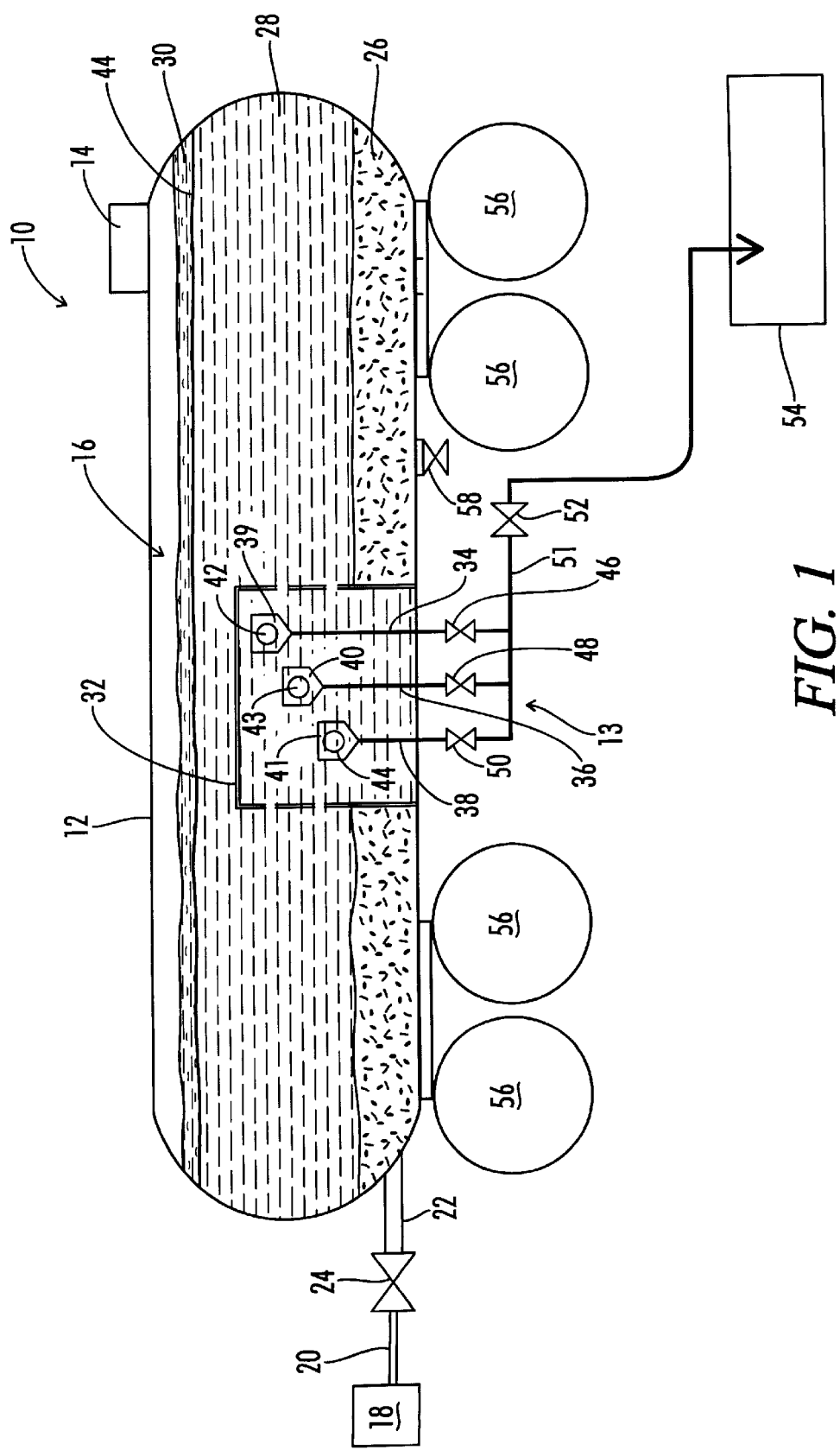
FIG. 1 is a side view of the mobile tank with a separator apparatus used to remove water from a mixed combination of oil, water and sludge.

An illustrative embodiment of a portable separator apparatus 10 of the current invention is shown in FIG. 1. The portable separator apparatus 10 is used to separate water 28 from a mixed composition including oil 30, water 28, and solids (such as sludge) 26. The portable separator apparatus 10 includes a tank 12 that is used to receive the mixed composition from an outside source 18. The outside source 18 can be one of the various sources, such as a vehicle wash station. The outside source 18 is connected to the tank 12 via an intake hose 20, an intake valve 24 and a tank inlet 22. The intake valve 24 is a manual valve that allows the user to open and close the connection between the outside source 18 and the tank 12 as desired by the user.

The mixed composition is drawn into the tank 12 from the outside source 18 via a vacuum source 14. The vacuum source 14 is connected to the tank 12 to create a vacuum area 16 in the tank 12. This vacuum is thereby able to draw the mixed composition into the tank 12 from the outside source 18 for separating the water 28 from the oil 30 and sludge 26 to allow the extraction of the water 28.

The separator apparatus 10 includes a drain manifold 13 that includes a first drain pipe 34, which has an upper end that extends into the tank 12 to a first elevation. A first floating check valve 39 is connected to the upper end of the first drain pipe 34. The check valve 39 includes a floating valve element 42 which floats above the first drain pipe 34. The floating valve element 42 is preferably made of stainless steel and preferably has a density of 0.95 specific gravity, which is less than the density of fresh water 28 (1.0 g/cm$^3$) but greater than the average density of crude oil 30. Therefore, the valve element 42 will float in water 28 to thereby open the floating check valve 39 when the valve element 42 is surrounded by water 28, but the valve element 42 will sink in oil 30 to close the floating check valve 39 when surrounded by oil 30. Additionally, a first drain shut off valve 46 is connected to the first drain pipe 34 below the first floating check valve 39 to allow the user to close the first pipe 34 when necessary.

The drain manifold 13 may further include a second drain pipe 36 that has an upper end extending upward into the tank 12 to a second elevation that is lower than the first drain pipe 34. A second floating check valve 40 is connected to the upper end of the second drain pipe 36. As with the first floating check valve 39, the second floating check valve 40 also includes a valve element 43 that is less dense than water 28 but is more dense than oil 30. Additionally, a second drain shut off valve 48 is disposed in the second drain pipe 36 below the second floating check valve 40.

Furthermore, a third drain pipe 38 may also be included in the drain manifold 13. The third drain pipe 38 has an upper end that extends upward into the tank 12 that is lower than both the first drain pipe 34 and the second drain pipe 36. A third floating check valve 41 is connected to the upper end of the drain pipe 38, and a third drain shut off valve 50 is disposed in the third drain pipe 38, below the third floating check valve 41. Additionally, the third floating check valve 41 includes a floating valve element 44 that has a density less than the density of water 28, and greater than the density of oil 30.

As stated above, the first drain pipe 34, second drain pipe 36, and third drain pipe 38 are each disposed at various elevations to provide a multiple phase separation of water 28 from within the tank 12. Additional drain pipes may be included, each with a floating check valve attached to the drain pipe and a drain shut off valve disposed in the drain pipe, and each additional drain pipe positioned at an elevation that differs from the other drain pipes. Preferably, the first drain pipe 38 (having the highest elevation) will be used to drain water before the second drain pipe 36 (having the second highest elevation), the second drain pipe 36 will drain water before the third drain pipe 38 (having the third highest elevation), and so on depending on the number of drain pipes provided in the drain manifold 13. This allows water to be drawn from the highest possible level above any solids which are separating downward to the layer of sludge 26.

In operation, the mixed composition is transferred into the tank 12 from the outside source 18. Flocculents and polymers are added to the mixed composition as it is drawn into the tank 12 to enhance the separation of the water 28 from the sludge 26 and the oil 30. This addition of flocculents and polymers is accomplished by placing the same into the storage sump 18 from which the mixed composition is being drawn. Typically, water 28 will need a dwell time of 30–40 minutes for the flocculents to precipitate the suspended solids (or sludge) 26 to the bottom of the tank 12. The mixed composition is allowed to separate into a lower sludge layer 26, a middle water layer 28, and a upper oil layer 30, with the oil layer 30 being located above the floating check valves 39, 40, and 41. The interface between the oil 30 and water 28 is designated by 44. Therefore the floating check valves 39, 40, and 41 are surrounded by water 28 and open to allow draining of the water 28.

Prior to the step of draining the water through the first drain pipe 34, the discharge line shut off valve 52 is opened to allow the passage of water 28 through the discharge line 51. Then drain valve 46 is opened and water 28 is then drained through the first drain pipe 34 until the oil layer 30 reaches the first check valve 39. Once the first valve element 42 of the first floating check valve 39 is surrounded by oil 30, the first valve element 42 will lower onto the first drain pipe 34 to close the first drain pipe 34. The first drain valve 46 can then be shut off by the user to prevent any further draining of the mixed composition that does not include water 28. The second shut off valve 48 is then opened so that water 28 will drain through the second drain pipe 36. When the oil 30 reaches floating check valve 40 of the second drain pipe 36, the floating check valve 40 will close as well. Again, the second drain shut off valve 48 can be closed by the user to prevent further draining of any elements of the mixed composition. The third shut off valve 50 is then opened to drain water through the third drain pipe 38 until the third floating check valve 41 is surrounded by oil 30. The third drain pipe 38 will drain water 28 until the third valve element 44 of the third floating check valve 41 is surrounded by oil 30, at which time it will also close the third drain pipe 38. The sludge layer 28 is prevented from flowing into the drain pipes 34, 36, and 38 during this process by a screen 32 that surrounds the first, second, and third drain pipes 34, 36, and 38.

The discharge line 51 of the separator apparatus 10 is connected to the first, second, and third drain pipes 34, 36, and 38. The discharge line 51 is connected between each drain pipe 34, 36, and 38, and the depositing area 54 for disposal of the water 28. The depositing area 54 is preferably a sewer system, but the water 28 can be drained to any location desired by the user. Disposed in the discharge line 51 is a discharge shut off valve 52, which is a manual valve that can be operated by the user. The discharge shut off valve 52 allows the user to stop any discharge to the depositing area 54 from the first discharge pipe 34, the second discharge pipe 36, and the third discharge pipe 38. The discharge shut off valve 52 therefore provides the user with an emergency means to close each drain pipe 34, 36, and 38 should any of the drain pipes 34, 36, and 38 pass oil 30 or sludge 26 or any other undesired material.

The tank 12 is further designed to allow for the sludge 26 and oil 30 to be transported for disposal. A clean out outlet 58 is attached to the system to allow the passage of the sludge 26 and oil 30 from the tank 12 to the location chosen by the customer.

The screen 32 surrounds the first drain pipe 34, the second drain pipe 36, and the third drain pipe 38 and the first floating check valve 39, second floating check valve 40, and the third floating check valve 41. The screen 32 has openings sized to impede the flow of solids (such as sludge) to any of the drain pipes 34, 36, and 38. The screen 32 is designed to allow the passage of water 28 and oil 30 to all of the drain pipes 34, 36, and 38, however.

As stated above, each of the shut off valves 46, 48, and 50 are manually operable. The shut off valves 46, 48, and 50 thereby allow the user to close any of the drain pipes 34, 36, and 38, individually whenever the user needs to. Consequently, the shut off valves 46, 48, and 50 therefore allow the user to override the draining process if the user detects any flow of oil 30 or sludge 26 through any of the drain pipes 46, 48, and 50.

Furthermore, as shown in FIG. 1, the tank 12 is a cylindrical tank and has a generally horizontal oriented longitudinal axis. The upper ends of the discharge pipes 34, 36, and 38 are located in the central third of the tank 12, both longitudinally and vertically within the tank 12. Additionally, a set of wheels 56 are connected to the tank 12 to support the tank 12 from the ground and to allow the tank 12 to be mobile from station to station where extraction of a mixed composition is necessary.

Thus, although there have been described particular embodiments of the present invention of a new and useful Oil/Water Separator, it is not intended that such references be construed as limitations upon the scope of this invention except as set forth in the following claims.

What is claimed is:

1. A portable separator apparatus for separating water from a mixed composition of oil, water and solids, comprising:

a portable tank for receiving the mixed composition;

a first drain pipe having an upper end extending upward into the tank to a first elevation;

a first floating check valve connected to the upper end of the first drain pipe, the check valve including a floating valve element having a density less than a density of water and greater than a density of oil, so that the floating valve element floats in water to open the check valve and sinks in oil to close the check valve; and a first drain shut off valve disposed in the first drain pipe below the first floating check valve.

2. The apparatus of claim 1, further comprising:

a second drain pipe having an upper end extending upward into the tank to a second elevation lower than the first elevation;

a second floating check valve connected to the upper end of the second drain pipe; and a second drain shut off valve disposed in the second drain pipe below the second floating check valve.

3. The apparatus of claim 2, further comprising:

a discharge line connected to both of said first and second drain pipes; and a discharge shut off valve disposed in the discharge line.

4. The apparatus of claim 2, further comprising:

a third drain pipe having an upper end extending upward into the tank to a third elevation lower than the second elevation;

a third floating check valve connected to the upper end of the third drain pipe; and a third drain shut off valve disposed in the third drain pipe below the third floating check valve.

5. The apparatus of claim 4, further comprising:

a screen surrounding the first, second and third drain pipes, the screen having openings sized to impede the flow of solids to the drain pipes.

6. The apparatus of claim 4, wherein:

the shut off valves are manually operable valves.

7. The apparatus of claim 2, wherein:

the tank is a cylindrical tank having a generally horizontally oriented longitudinal axis; and the upper ends of the discharge pipes are located in a central third of the tank interior both longitudinally and vertically.

8. The apparatus of claim 1, further comprising:

a screen extending upward from a bottom of the tank and surrounding the drain pipe to screen solids out of a zone around the drain pipe.

9. The apparatus of claim 1, further comprising:

wheels supporting the portable tank from the ground.

10. The apparatus of claim 1, wherein:

the tank is a closed tank, and the apparatus further comprises:

a vacuum source connected to the tank for drawing a vacuum in the tank;

a tank inlet for receiving the mixed composition; and an inlet shut off valve connected to the inlet.

11. A transportable suction separator system, comprising:

a horizontally oriented cylindrical closed tank having an interior and having a tank inlet;

a vacuum source connected to the tank for drawing a vacuum in the tank so that a liquid mixture can be drawn through the tank inlet into the tank interior;

an inlet shut off valve connected to the tank inlet;

a drain manifold including first and second drain pipes extending upward into the tank interior to a higher and a lower elevation, respectively; and first and second floating check valves mounted on the first and second drain pipes, the check valves being constructed to be closed when surrounded by a liquid of density less than a predetermined value.

12. The system of claim 11, wherein the predetermined value is less than the density of water.

13. The system of claim 11, further comprising:

a screen surrounding the drain pipes and check valves.

14. The system of claim 11, wherein the drain manifold further comprises:

first and second drain shut off valves connected to the first and second drain pipes, respectively;

a discharge line downstream of the drain shut off valves; and a discharge shut off valve.

15. A method of on site separation of water from a mixed composition of oil, water and sludge, comprising:

(a) providing a separation tank having first and second drain pipes extending into the tank to higher and lower elevations, respectively, each drain pipe having a floating check valve on an upper end thereof which floats in water and sinks in oil, and having first and second drain shut off valves connected to the first and second drain pipes, respectively;

(b) transferring the mixed composition into the tank;

(c) allowing the mixed composition to separate into a lower sludge layer, a middle water layer, and an upper oil layer, the oil layer being located above both check valves so that both check valves are open;

(d) draining water through the first drain pipe until the oil layer reaches the first check valve and the first check valve closes; and (e) then opening the second shut off valve and draining water through the second drain pipe.

16. The method of claim 15, further comprising:

preventing sludge from flowing into the drain pipes by screening the sludge from a zone surrounding the check valves.

17. The method of claim 15, further comprising:

removing a majority of the water from the mixed composition on site; and transporting the tank containing the oil and sludge to an off site disposal location.

18. The method of claim 15, wherein step (b) includes:

creating a vacuum in the tank; and sucking the mixed composition into the tank.

19. The method of claim 15, further comprising:

during step (b), adding flocculents and polymers to the mixed composition to enhance separation of sludge from the mixed composition.

20. The method of claim 15, further comprising:

prior to step (d), opening a discharge line shut off valve downstream of the first and second drain shut off valves.

* * * * *